(12) United States Patent
Carlsson et al.

(10) Patent No.: US 12,273,224 B2
(45) Date of Patent: Apr. 8, 2025

(54) CONTROLLING PEAK-TO-AVERAGE POWER RATIO REDUCTION

(71) Applicant: Telefonaktiebolaget LM Ericsson (publ), Stockholm (SE)

(72) Inventors: Roland Carlsson, Öjersjö (SE); Aare Mällo, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/553,498

(22) PCT Filed: Mar. 31, 2021

(86) PCT No.: PCT/EP2021/058404
§ 371 (c)(1),
(2) Date: Sep. 29, 2023

(87) PCT Pub. No.: WO2022/207088
PCT Pub. Date: Oct. 6, 2022

(65) Prior Publication Data
US 2024/0364570 A1    Oct. 31, 2024

(51) Int. Cl.
*H04B 7/0413*    (2017.01)
*H04L 27/26*    (2006.01)
(52) U.S. Cl.
CPC ....... *H04L 27/2623* (2013.01); *H04B 7/0413* (2013.01)
(58) Field of Classification Search
CPC ............ H04L 27/2613; H04L 27/2618; H04B 7/0456; H04B 7/0413
See application file for complete search history.

(56) References Cited

U.S. PATENT DOCUMENTS

2014/0270016 A1    9/2014    Piazzi et al.
2019/0379437 A1*   12/2019   Park ..................... H04L 27/2636

FOREIGN PATENT DOCUMENTS

EP    2962437 A1    1/2016
WO    2007073490 A2    6/2007

OTHER PUBLICATIONS

International Search Report and Written Opinion of the International Searching Authority, issued in corresponding International Application No. PCT/EP2021/058404, dated Nov. 30, 2021, 12 pages.

(Continued)

*Primary Examiner* — Rahel Guarino
(74) *Attorney, Agent, or Firm* — Rothwell, Figg, Ernst & Manbeck, P.C.

(57) ABSTRACT

A method of controlling peak-to-average power ratio (PAPR) reduction for a multi-antenna transmitter using OFDM is disclosed. Similar to tone injection, a Peak reduction signal is added to the subcarriers for suppressing peaks of the transmitted signal. However different schemes summarized on FIG. 2 are proposed for such a superimposition of a peak reduction signal. Subcarriers carrying reference signals (DMRS) might not carry any peak reduction signal (FIG. 2b) or at a lower power than data subcarriers (FIG. 2c). Furthermore data subcarriers may be zeroed out to carry the peak reduction signal (resulting in tone insertion, FIG. 2d) or the modulation order of the data subcarriers might be reduced to increase the power of the peak reduction signal.

20 Claims, 3 Drawing Sheets

(56) References Cited

OTHER PUBLICATIONS

Detwiler et al., "OFDM Receiver Design for Active Constellation Extension", Signals, Systems and Computers, Conference Record of the Thirty-Ninth Asilomar Conference, Oct. 28, 2005, pp. 1485-1489.
Krongold et al., "Fast Active Constellation Extension for Mimo-OFDM PAR Reduction", Signals, Systems and Computers, Conference Record of the Thirty-Ninth Asilomar Conference, Oct. 28, 2005, pp. 1476-1479.
Studer, Christoph, et al., "Democratic Representations", arXiv:1401.3420v2 [cs.IT], Apr. 2015, 43 pages.

\* cited by examiner

CONTROLLING PEAK-TO-AVERAGE POWER RATIO REDUCTION

CROSS REFERENCE TO RELATED APPLICATION(S)

This application is a 35 U.S.C. § 371 National Phase Entry Application from PCT/EP2021/058404, filed Mar. 31, 2021, designating the United States, the disclosure of which is incorporated herein by reference in its entirety.

TECHNICAL FIELD

The present disclosure relates generally to the field of wireless communication. More particularly, it relates to peak-to-average power ratio (PAPR) reduction for a multi-antenna transmitter in wireless communication.

BACKGROUND

Many wireless communication systems have problems with energy efficiency and/or nonlinearities in the radio frequency parts of transceivers. Reduction of the peak-to-average power ratio (PAPR) is a common way to mitigate such problems.

PAPR reduction may be achieved by using crest-factor reduction (CFR) techniques (e.g., iterative clipping and filtering). However, application of CFR techniques may entail increase in one or more of computational complexity, latency, and error vector magnitude (EVM) at the receiver.

PAPR reduction in massive MIMO systems may be achieved by utilizing the spatial domain to direct the clipping signal in directions other than that of the intended receiver, which may—at least partly—mitigate the above problems regarding complexity, latency, and EVM. One example of such approaches is convex reduction of amplitudes (CRAM; see, e.g., "Democratic representations" by Studer, Goldstein, Yin, and Baraniuk, published 2014, and available online at http://arxiv.org/abs/1401.3420), wherein the PAPR is iteratively reduced.

However, the performance of such algorithms is dependent on accurate channel knowledge. In practice, the channel often changes from the time of channel estimation to the time of transmission. This may lead to that a portion of the clipping signal is inadvertently directed towards the intended receiver, which typically results in degraded reception performance. The problem may be particularly prominent when the intended receiver is moving at high speed.

Therefore, there is a need for alternative approaches for PAPR reduction control. Preferably, such approaches provide improved reception performance (e.g., compared to other PAPR reduction approaches). Also preferably, such approaches achieving proper results with regard to energy efficiency and/or radio nonlinearities.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

A first aspect is a method of controlling peak-to-average power ratio (PAPR) reduction for a multi-antenna transmitter. The method comprises determining a precoder setting for transmission of an orthogonal frequency division multiplexing (OFDM) signal by the multi-antenna transmitter to one or more receivers. The precoder setting comprises a primary portion and a PAPR reduction portion, and the OFDM signal comprises data parts and non-data parts, the non-data parts comprising reference parts. The method also comprises allocating (for at least some of the non-data parts) a first power to the PAPR reduction portion for sub-carriers conveying the non-data parts and allocating a second power to the PAPR reduction portion for other sub-carriers, wherein the first power per sub-carrier is lower than the second power per sub-carrier.

In some embodiments, the first power is zero.

In some embodiments, determining the precoder setting is based on acquired channel estimations.

In some embodiments, the method further comprises acquiring the channel estimations.

In some embodiments, acquiring the channel estimations comprises receiving reports from the one or more receivers, wherein the reports are indicative of results of channel measurements performed on a previously transmitted OFDM signal.

In some embodiments, acquiring the channel estimations comprises performing reciprocity based channel measurements on received reference signaling.

In some embodiments, the method further comprises transmitting the OFDM signal while applying the determined precoder setting and using the first and second power allocated to the PAPR reduction portion.

In some embodiments, the primary portion is configured to generate a primary beamforming signal and the PAPR reduction portion is configured to generate a clipping signal. Transmission of the OFDM signal may comprise spatially multiplexing the clipping signal onto other directions other than a main direction of the primary beamforming signal.

In some embodiments, the method further comprises transmitting first control signaling to the one or more receivers, wherein the first control signaling is indicative of at least the first power.

In some embodiments, the reference parts comprise one or more of: demodulation reference signals, DM-RS, and channel state information reference signals, CSI-RS.

In some embodiments, the non-data parts comprise one or more of: acknowledgement signals, ACK, and transmit power control signals, TPC.

In some embodiments, the OFDM signal comprises OFDM symbols, and the OFDM symbols comprise a sub-set of OFDM symbols carrying the non-data parts. The method may further comprise reducing an amount of data carried by the sub-set of OFDM symbols.

In some embodiments, reducing the amount of data comprises hindering the sub-set of OFDM symbols from carrying any of the data parts.

In some embodiments, reducing the amount of data comprises determining a first order of modulation for the sub-set of OFDM symbols and determining a second order of modulation for other OFDM symbols, wherein the first order of modulation is lower than the second order of modulation.

In some embodiments, the method further comprises applying a same coding rate for the sub-set of OFDM symbols as for the other OFDM symbols.

In some embodiments, the method further comprises transmitting second control signaling to the one or more receivers, wherein the second control signaling is indicative of at least the first order modulation.

In some embodiments, the method is executed responsive to determining that a PAPR reduction mode with power reduction is applicable.

In some embodiments, the method further comprises transmitting third control signaling to the one or more receivers, wherein the third control signaling is indicative of that the PAPR reduction mode with power reduction is applicable.

A second aspect is a computer program product comprising a non-transitory computer readable medium, having thereon a computer program comprising program instructions. The computer program is loadable into a data processing unit and configured to cause execution of the method according to the first aspect when the computer program is run by the data processing unit.

A third aspect is an apparatus for controlling peak-to-average power ratio (PAPR) reduction for a multi-antenna transmitter. The apparatus comprises controlling circuitry configured to cause determination of a precoder setting for transmission of an orthogonal frequency division multiplexing (OFDM) signal by the multi-antenna transmitter to one or more receivers. The precoder setting comprises a primary portion and a PAPR reduction portion, and the OFDM signal comprises data parts and non-data parts, the non-data parts comprising reference parts. The controlling circuitry is also configured to cause allocation (for at least some of the non-data parts) of a first power to the PAPR reduction portion for sub-carriers conveying the non-data parts and allocation a second power to the PAPR reduction portion for other sub-carriers, wherein the first power per sub-carrier is lower than the second power per sub-carrier.

A fourth aspect is a multi-antenna transmitter comprising the apparatus of the third aspect.

A fifth aspect is a radio access node comprising the apparatus of the third aspect and/or the multi-antenna transmitter of the fourth aspect.

A sixth aspect is a user equipment (UE) comprising the apparatus of the third aspect and/or the multi-antenna transmitter of the fourth aspect.

A seventh aspect is a control node comprising the apparatus of any of the third aspect, and configured to control a radio access node comprising the multi-antenna transmitter of the fourth aspect and/or a user equipment, UE, comprising the multi-antenna transmitter of fourth aspect.

In some embodiments, any of the above aspects may additionally have features identical with or corresponding to any of the various features as explained above for any of the other aspects.

Generally, a PAPR reduction mode with power reduction may be seen as referring to a PAPR reduction mode where power per sub-carrier for the PAPR reduction portion is lower for sub-carriers conveying the non-data parts than for other sub-carriers.

An advantage of some embodiments is that alternative approaches for PAPR reduction control are provided.

An advantage of some embodiments is that reception performance is improved (e.g., compared to other PAPR reduction approaches).

An advantage of some embodiments is that proper results are achieved by the PAPR reduction with regard to energy efficiency and/or radio nonlinearities An advantage of some embodiments is that reduction (e.g., compared to other PAPR reduction approaches) is achieved of one or more of computational complexity, latency, and EVM at the receiver.

An advantage of some embodiments is that the impact of inaccurate channel knowledge is reduced (e.g., compared to other PAPR reduction approaches).

An advantage of some embodiments is that channel estimation at receiver(s) of the OFDM signal is improved (e.g., compared to other PAPR reduction approaches), since signal portions suitable for channel measurements (e.g., reference signals) are less affected by clipping than other signal portions.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

Generally, a radio access node may refer to any suitable radio access node (e.g., a base station (BS), a NodeB, a gNB, an access point (AP), an access point station (AP-STA), etc.). Similarly, a user device (UE) may refer to any suitable user device (e.g., a Third Generation Partnership Project (3GPP) UE, a non-access point station (non-AP STA), a station (STA), etc.).

In the following, embodiments will be described where PAPR reduction is controlled to mitigate its detrimental effects on specific parts of a transmitted OFDM signal comprising OFDM symbols.

Figure 1:
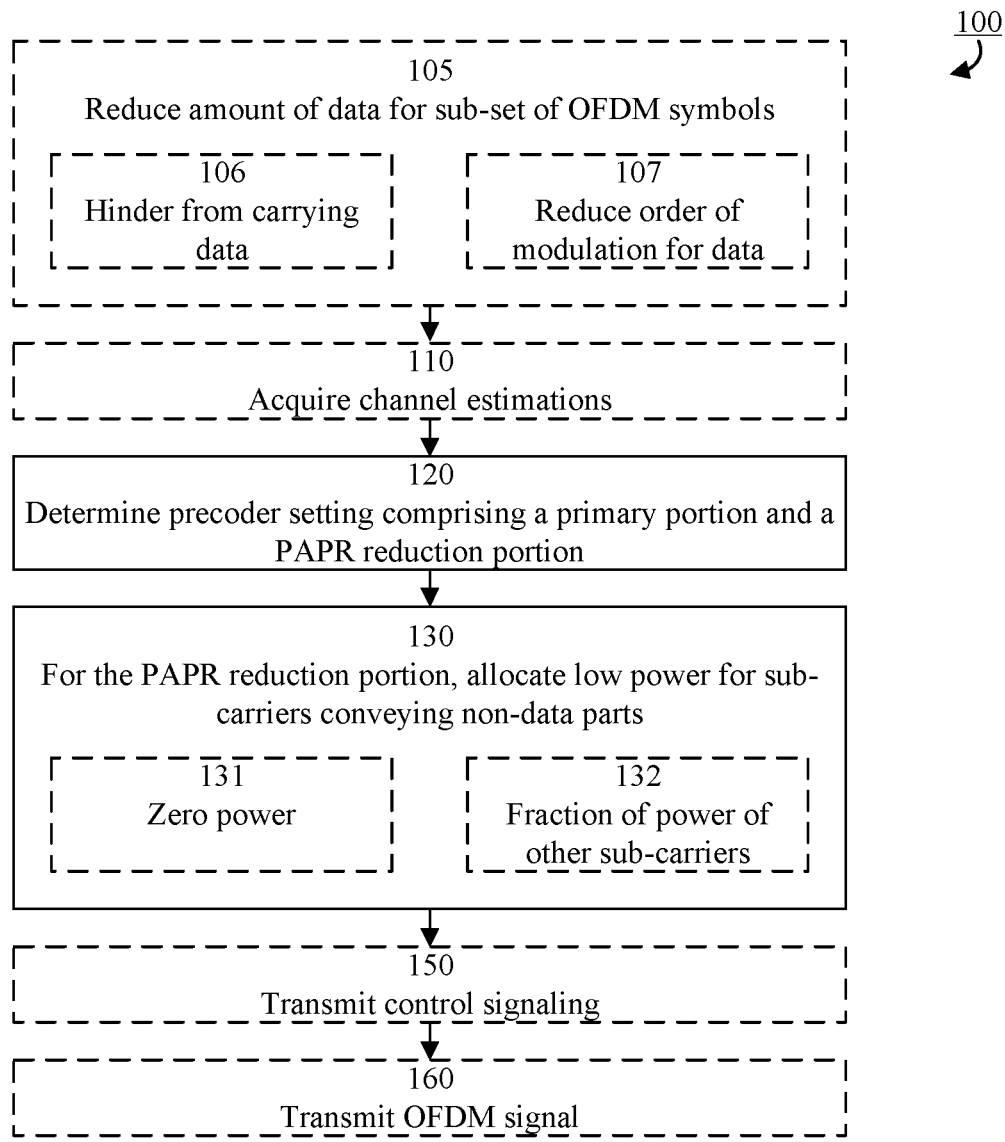
FIG. 1 is a flowchart illustrating example method steps according to some embodiments.

FIG. 1 illustrates an example method 100 according to some embodiments. The method 100 is for controlling PAPR reduction for a multi-antenna transmitter. For example, the method 100 may be performed by a multi-antenna transmitter, a radio access node comprising a multi-antenna transmitter, a UE comprising a multi-antenna transmitter, or a control node configured to control a multi-antenna transmitter.

In step 120, a precoder setting is determined for transmission of an OFDM signal by the multi-antenna transmitter to one or more receivers (e.g., one or more UEs when the multi-antenna transmitter is for a radio access node). The precoder setting may be determined according to any suitable approach (e.g., using CRAM or another CFR approach).

The precoder setting comprises a primary portion and a PAPR reduction portion. Typically, the primary portion is configured to generate a primary beamforming signal and the PAPR reduction portion is configured to generate a clipping signal. Typically, the primary beamforming signal comprises a message for one or more intended receiver(s) (e.g., a data message). Thus, the primary portion may be seen as a precoding setting portion for a message for one or more intended receiver(s).

In some embodiments, transmission of the OFDM signal comprises spatially multiplexing the clipping signal onto other directions other than a main direction of the primary beamforming signal.

Determining the precoder setting in step 120 may be based on acquired channel estimations. To this end, the method 100 may further comprise acquiring the channel estimations, as illustrated by optional step 110.

Step 110 may comprise receiving reports from the one or more receivers, wherein the reports are indicative of results of channel measurements performed by one or more receivers on one or more previously transmitted OFDM signal(s). For example, such channel measurements may be performed on reference parts of one or more previously transmitted OFDM signal(s).

Alternatively or additionally, step 110 may comprise performing reciprocity based channel measurements on received reference signaling (e.g., demodulation reference signals (DM-RS), sounding reference signals (SRS), physical random access channel (PRACH) signals, physical uplink control channel (PUCCH) signals, etc.) from the one or more receivers.

The OFDM signal to be transmitted by the multi-antenna transmitter to the one or more receivers comprises data parts and non-data parts, wherein the non-data parts in turn comprise reference parts. A signal part may, for example, be transmitted using one or more sub-carriers in one or more OFDM symbols.

Reference parts may be any signal parts suitable for measurements by the receiver(s). Example reference parts include demodulation reference signals (DM-RS), and channel state information reference signals (CSI-RS).

Non-data parts may be any signal parts not carrying data. For example, non-data parts may be any signal parts that are particularly critical for communication performance (e.g., more critical than the data parts). Example non-data parts include reference parts, physical downlink control channel (PDCCH) signals, acknowledgement signals (ACK), and transmit power control signals (TPC).

In step 130, and for at least for some (e.g., all) of the non-data parts, a relatively low power is allocated for sub-carriers conveying the non-data parts. This is achieved by allocating a first power to the PAPR reduction portion for sub-carriers conveying the non-data parts and allocating a second power to the PAPR reduction portion for other sub-carriers, wherein the first power per sub-carrier is lower than the second power per sub-carrier.

For example, the first power may be zero as illustrated by optional sub-step 131, or the first power per sub-carrier may be a fraction of the second power per sub-carrier as illustrated by optional sub-step 132 (the fraction may for example be determined to enable PAPR to be reduced below a threshold value).

As illustrated by optional step 160, the method 100 may also comprise transmitting the OFDM signal, while applying the determined precoder setting for the primary portion and the PAPR reduction portion, and while using the first and second power allocated to the PAPR reduction portion.

As illustrated by optional step 105, the method 100 may also comprise reducing the amount of data for a sub-set of OFDM symbols (e.g., some, or all, OFDM symbols carrying non-data parts). The reduction of data may generally enable (e.g., lead to) a reduction of power per sub-carrier for the data (i.e., for the primary portion).

The amount of data may be reduced by hindering the sub-set of OFDM symbols from carrying any of the data parts, as illustrated by optional-sub-step 106. Then, the power per sub-carrier for the primary portion will be zero.

Alternatively or additionally, the amount of data may be reduced by reducing the order of modulation for data, as illustrated by optional-sub-step 107 (e.g., by determining a first order of modulation for the sub-set of OFDM symbols and determining a second order of modulation for other OFDM symbols, wherein the first order of modulation is lower than the second order of modulation). Typically, the same coding rate is applied for the sub-set of OFDM symbols as for the other OFDM symbols, when the order of modulation is reduced for data. Lowering the order of modulation typically enables using of a lower power per sub-carrier.

In some embodiments, step 105 may further comprise reducing the amount of some non-data signals for the sub-set of OFDM symbols, in a similar manner as the amount of data is reduced. For example, when the sub-set of OFDM symbols carry reference parts, the amount of control signaling may be reduced for the sub-set of OFDM symbols.

As illustrated by optional step 150, the method 100 may comprise transmitting control signaling to the one or more receivers before the transmission of the OFDM signal.

Such control signaling may, for example comprise first control signaling indicative of at least the first power and/or second control signaling indicative of at least the first order modulation. The first and second control signaling may be comprised in the same control signal or in different control signals.

The first control signaling may enable the receiver(s) to properly use at least the non-data parts; e.g., determining correct values of signal-to-interference-and-noise ratios (SINR) for data parts based on measurements performed on reference parts. In some embodiments, the first control signaling may also enable the receiver(s) to properly use the data parts.

For example, the first control signaling may indicate the first power explicitly. Alternatively or additionally, the first control signaling may indicate the first power implicitly (e.g., as a difference between the second power per sub-carrier and the first power per sub-carrier, or as a ratio between the first power per sub-carrier and the second power per sub-carrier).

The second control signaling may enable the receiver(s) to use the correct demodulation for the data of each considered OFDM symbol.

In some embodiments, the method 100 is executed responsive to determining that a PAPR reduction mode with power reduction is applicable. For example, the method 100 might not be executed when PAPR reduction is not active. Alternatively or additionally, the method 100 might be executed only for some situations with PAPR reduction (e.g., when a receiver is moving at high speed).

Thus, the method 100 may be triggered by a determination that a PAPR reduction mode with power reduction is applicable.

In some embodiments, third control signaling indicative of that the PAPR reduction mode with power reduction is applicable may be transmitted to the one or more receivers (e.g., responsive to the determination that a PAPR reduction mode with power reduction is applicable, and/or as part of the control signaling in step 150).

Thus, according to some embodiments, mitigation is provided of channel ageing impact on PAPR reduction for large antenna systems, so that reception performance can be enhanced (especially when receiver(s) is/are moving at high speed).

Some embodiments protect reference signals (e.g., DM-RS) from impact of clipping signals (e.g., irrespective of how much the receiver(s) has/have moved between the time for channel estimation and time for transmission). The protection can be performed by modifying the spatial CFR algorithm so that no clipping signal (or at least a reduced clipping signal) is transmitted in the frequency parts (e.g., sub-carriers) where reference signals are transmitted. Some embodiments provide additional protection by reducing the amount of data scheduled in the OFDM symbols where reference signals are transmitted. The amount of data may be reduced by hindering OFDM symbols where reference signals are transmitted from carrying any of the data parts, or by reducing the order of modulation for data in OFDM symbols where reference signals are transmitted. Reducing the order of modulation typically enables using of a lower power per sub-carrier for the primary portion.

An advantage of some embodiments is that a receiver can perform channel estimation for data reception at any physical position (i.e., irrespective of how much the receiver has moved between the time for channel estimation and time for transmission) without interference from the clipping signal resulting from the CFR algorithm, which typically leads to improved reception performance.

Figure 2:
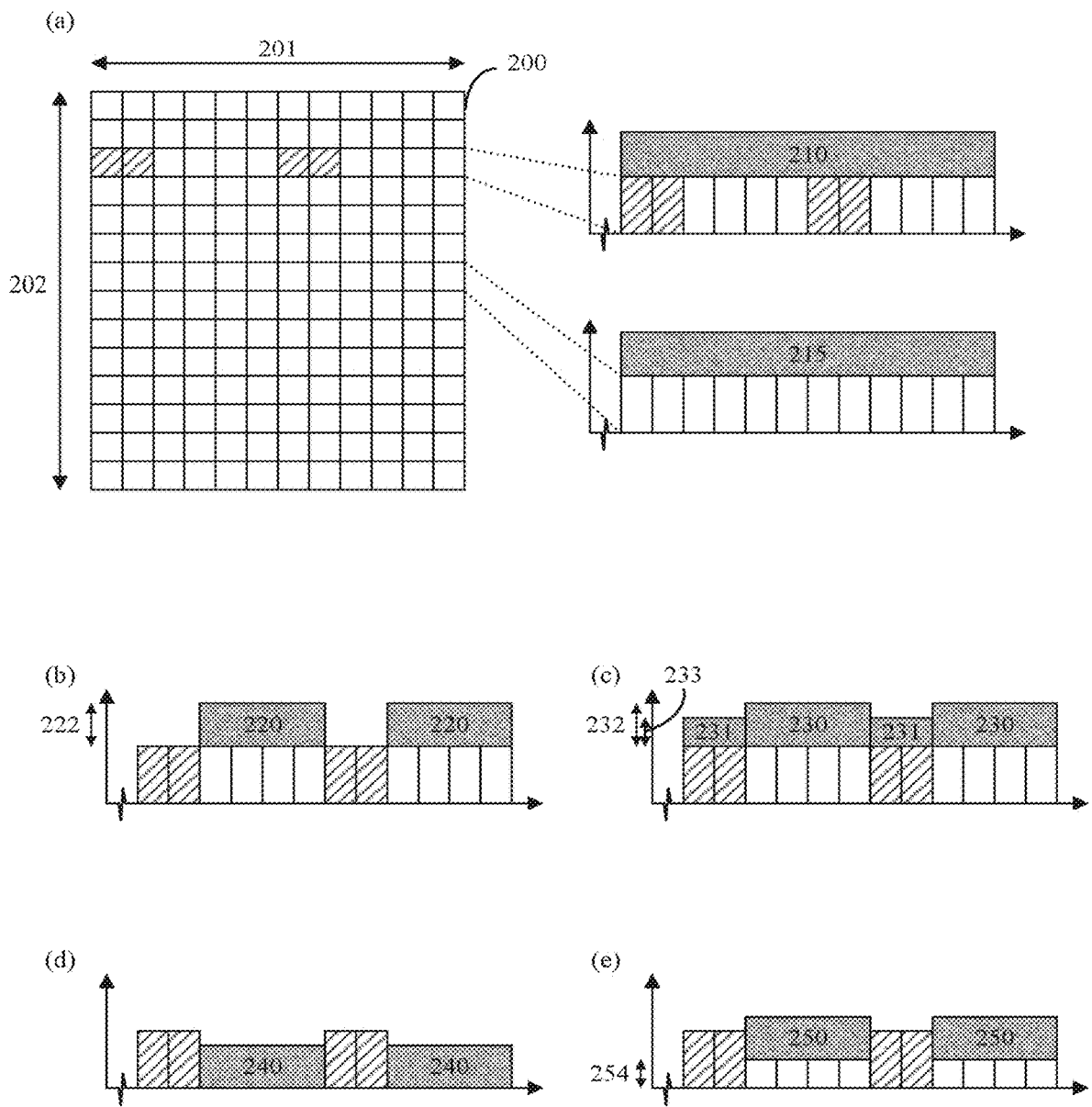
FIG. 2 is a collection of schematic drawings illustrating power allocation principles according to some embodiments.

FIG. 2 schematically illustrates a selection of power allocation principles according to some embodiments.

Part (a) of FIG. 2 shows an example resource block 200 in a time-frequency grid for OFDM signaling. The resource block 200 extends over a number of sub-carriers 201 in the frequency domain and over a number of OFDM symbols 202 in the time domain. Example allocations for DM-RS are illustrated by diagonally striped allocation units, while the remaining allocation units may be allocated for data, for example. In this example, the DM-RS is allocated for sub-carriers 0, 1, 6, 7 (of 12 sub-carriers 201 indexed 0-11) in OFDM symbol 2 (of 14 OFDM symbols 202 indexed 0-13).

The right hand diagrams of part (a) of FIG. 2 illustrates power allocation for two different OFDM symbols (sub-carriers on the x-axis and power allocation per sub-carrier on the y-axis).

The diagrams show—for an OFDM symbol with DM-RS and an OFDM symbol without DM-RS—power allocation to the PAPR reduction portion (210, 215) of the OFDM signaling on top of the power allocation to the primary portion of the OFDM signaling.

Part (b) of FIG. 2 illustrates embodiments, where—for the OFDM symbol with DM-RS—the power allocation to the PAPR reduction portion of the OFDM signaling is different from that, 210, illustrated in part (a) of FIG. 2. In part (b) of FIG. 2, a first power that equals zero is allocated to the PAPR reduction portion for sub-carriers conveying the DM-RS (non-data parts) and a second power per sub-carrier 222 is allocated to the PAPR reduction portion for other sub-carriers. Thus, the PAPR reduction portion is only applied to the other sub-carriers for this OFDM symbol, as illustrated by 220.

Part (c) of FIG. 2 illustrates embodiments, where—for the OFDM symbol with DM-RS—the power allocation to the PAPR reduction portion of the OFDM signaling is different from that, 210, illustrated in part (a) of FIG. 2. In part (c) of FIG. 2, a first power per sub-carrier 233 is allocated to the PAPR reduction portion for sub-carriers conveying the DM-RS (non-data parts) and a second power per sub-carrier 232 is allocated to the PAPR reduction portion for other sub-carriers. Thus, the PAPR reduction portion is applied with the first power to the sub-carriers conveying the DM-RS as illustrated by 231, and is applied with the second power to the other sub-carriers for this OFDM symbol, as illustrated by 230. It can be seen that the first power per sub-carrier is lower than the second power per sub-carrier.

Part (d) of FIG. 2 illustrates embodiments, where—for the OFDM symbol with DM-RS—the data is handled differently from the example illustrated in part (b) of FIG. 2 (while it should be noted that some embodiments may use the example illustrated in part (c) of FIG. 2 as starting point instead). In part (d) of FIG. 2, a first power that equals zero is allocated to the PAPR reduction portion for sub-carriers conveying the DM-RS (non-data parts) and a second power is allocated to the PAPR reduction portion for other sub-carriers. Thus, the PAPR reduction portion is only applied to the other sub-carriers for this OFDM symbol, as illustrated by 240. Furthermore, the amount of data for the OFDM symbol is reduced. In this example, the amount of data is reduced by hindering the OFDM symbol from carrying any data at all.

Alternatively, the amount of data may be reduced by hindering the OFDM symbol from carrying data in some of the sub-carriers not allocated for DM-RS.

Part (e) of FIG. 2 illustrates embodiments, where—for the OFDM symbol with DM-RS—the data is handled differently from the example illustrated in part (b) of FIG. 2 (while it should be noted that some embodiments may use the example illustrated in part (c) of FIG. 2 as starting point instead). In part (e) of FIG. 2, a first power that equals zero is allocated to the PAPR reduction portion for sub-carriers conveying the DM-RS (non-data parts) and a second power is allocated to the PAPR reduction portion for other sub-carriers. Thus, the PAPR reduction portion is only applied to the other sub-carriers for this OFDM symbol, as illustrated by 250. Furthermore, the data portions have lower power per sub-carrier 254 than in part (b) of FIG. 2. This may be enabled by reducing the order of modulation for data (and thereby reducing the amount of data of the OFDM symbol) compared to that used in part (a), (b), or (c) of FIG. 2. Then, the power per sub-carrier for the primary portion (the data of the OFDM symbol) can be reduced by an amount corresponding to at most the signal-to-interference ratio (SIR) gain established by the reduction of the order of modulation.

Figure 3:
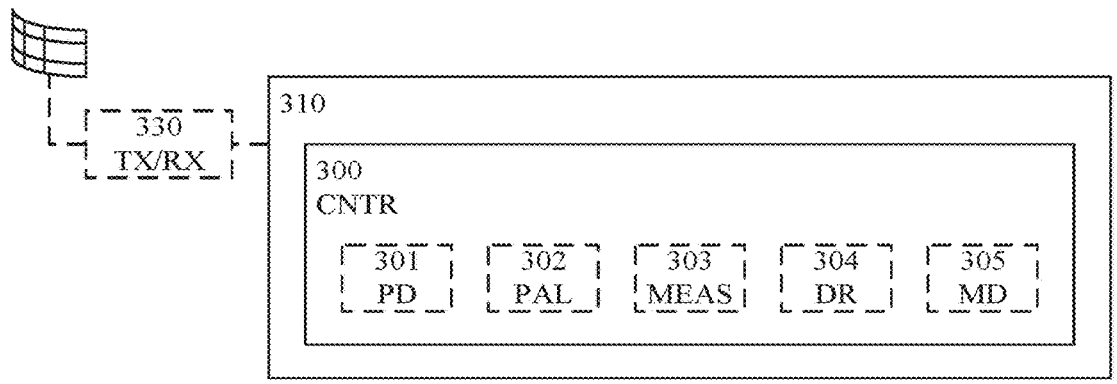
FIG. 3 is a schematic block diagram illustrating an example apparatus according to some embodiments.

FIG. 3 schematically illustrates an example apparatus 310 according to some embodiments. The apparatus 310 is for controlling peak-to-average power ratio (PAPR) reduction for a multi-antenna transmitter.

In some embodiments, the apparatus 310 is comprisable (e.g., comprised) in the multi-antenna transmitter. In some embodiments, the apparatus 310 is comprisable (e.g., comprised) in a radio access node comprising the multi-antenna transmitter. In some embodiments, the apparatus 310 is comprisable (e.g., comprised) in a user equipment comprising the multi-antenna transmitter. In some embodiments, the apparatus 310 is comprisable (e.g., comprised) in a control node configured to control a radio access nod or user equipment comprising the multi-antenna transmitter.

Alternatively or additionally, the apparatus 310 may be configured to cause execution of (e.g., execute) one or more steps of the method 100 of FIG. 1.

The apparatus 310 comprises a controller (CNTR; e.g., controlling circuitry or a control module) 300.

The controller 300 is configured to cause determination of a precoder setting for transmission of an orthogonal frequency division multiplexing (OFDM) signal by the multi-antenna transmitter to one or more receivers (compare with step 120 of FIG. 1). The precoder setting comprises a primary portion and a PAPR reduction portion, and the OFDM signal comprises data parts and non-data parts (which in turn comprises reference parts).

To this end, the controller 300 may comprise, or be otherwise associated with (e.g., connectable, or connected, to), a precoder determiner (PD; e.g., precoding determining circuitry or a precoding determination module) 301. The precoder determiner 301 may be configured to determine the precoder setting.

The controller 300 is also configured to cause allocation, for at least some of the non-data parts, of a first power to the PAPR reduction portion for sub-carriers conveying the non-data parts and allocation of a second power to the PAPR reduction portion for other sub-carriers, wherein the first power per sub-carrier is lower than the second power per sub-carrier (compare with step 130 of FIG. 1).

To this end, the controller 300 may comprise, or be otherwise associated with (e.g., connectable, or connected, to), a power allocator (PAL; e.g., power allocating circuitry or a power allocation module) 302. The power allocator 302 may be configured to allocate the first and second power.

The controller 300 may also be configured to cause acquisition of the channel estimations (compare with step 110 of FIG. 1).

To this end, the controller 300 may comprise, or be otherwise associated with (e.g., connectable, or connected, to), a receiver (RX; e.g., receiving circuitry or a reception module); illustrated in FIG. 3 as part of a transceiver 330. The receiver may be configured to acquire the channel estimations by receiving reports from the one or more receivers, wherein the reports are indicative of results of channel measurements performed on a previously transmitted OFDM signal.

Alternatively or additionally, to this end, the controller 300 may comprise, or be otherwise associated with (e.g., connectable, or connected, to), a measurer (MEAS; e.g., measuring circuitry or a measurement module) 303. The measurer may be configured to acquire the channel estimations by performing reciprocity based channel measurements on received reference signaling.

The controller 300 may also be configured to cause transmission of the OFDM signal (compare with step 160 of FIG. 1) and/or transmission of control signaling to the one or more receivers (compare with step 150 of FIG. 1).

To this end, the controller 300 may comprise, or be otherwise associated with (e.g., connectable, or connected, to), a transmitter (TX; e.g., transmitting circuitry or a transmission module); illustrated in FIG. 3 as part of a transceiver 330. The transmitter may be configured to transmit the OFDM signal and/or the control signaling.

The controller 300 may also be configured to cause reduction of an amount of data carried by a sub-set of OFDM symbols (compare with step 105 of FIG. 1).

To this end, the controller 300 may comprise, or be otherwise associated with (e.g., connectable, or connected, to), a data reducer (DR; e.g., data reducing circuitry or a data reduction module) 304. The data reducer 304 may be configured to reduce the amount of data carried by the sub-set of OFDM symbols (e.g., by hindering data from being carried by the sub-set of OFDM symbols or by reducing a modulation order for the data carried by the sub-set of OFDM symbols).

The controller 300 may also be configured to cause determination of whether a PAPR reduction mode with power reduction is applicable. To this end, the controller 300 may comprise, or be otherwise associated with (e.g., connectable, or connected, to), a mode determiner (MD; e.g., mode determining circuitry or a mode determination module) 305. The mode determiner 305 may be configured to determine whether the PAPR reduction mode with power reduction is applicable.

It should be noted that features described in connection to the method 100 of FIG. 1 may be equally applicable in for the apparatus of FIG. 3, even if not explicitly mentioned in connection thereto.

Generally, it should be understood that an exemplification of being configured to cause performance is provided by being configured to perform the action.

Figure 4:
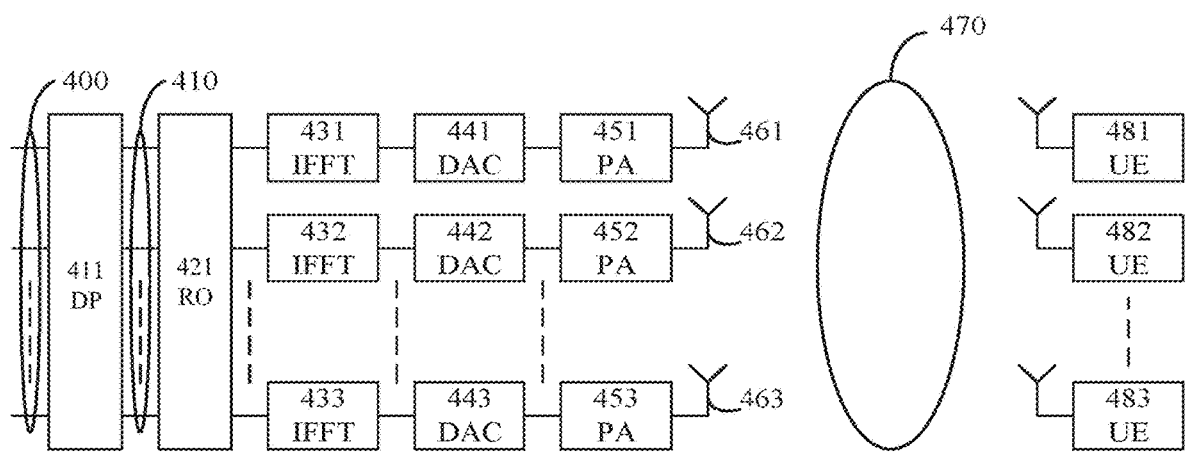
FIG. 4 is a schematic block diagram illustrating an example system according to some embodiments.

A context of some embodiments will now be described with reference to FIG. 4, that schematically illustrates an example system.

The system is a multiple input, multiple output (MIMO) communication system where a base station (BS) with M antenna elements 461, 462, 463 is to convey K<M layers of data to the user equipments (UE) 481, 482, 483 in the same time-frequency recourse by exploiting spatial multiplexing. The BS uses the OFDM technique to increase the bandwidth efficiency and robustness to the multipath environment. To combat high peak-to-average power ratio (PAPR), the BS is equipped with a digital precoder (DP) 411 in the baseband.

It is assumed that $s_n \in \mathbb{C}^K$ denotes the K-th layer of data fed to the digital precoder in the n-th subcarrier, and that N denotes the number of subcarriers in an OFDM symbol. All layers of data are stacked in an augmented vector of size KN. Hence, the input 400 of the digital precoder 411 may be expressed as $\tilde{s}=[s_1^T, s_2^T, \ldots, s_N^T]^T \in \mathbb{C}^{KN}$.

It is also assumed that $x_n \in \mathbb{C}^M$ denotes the precoded vector of all M transmit antennas for the n-th subcarrier, and $\tilde{x}=[x_1^T, x_2^T, \ldots, x_N^T]^T \in \mathbb{C}^{MN}$ is defined in a similar fashion as above, expressing the output 410 of the digital precoder 411. The precoder executed the precoder setting as referred to herein.

A permutation matrix T is used by a reorderer (RO) 421 to map the elements of the precoded vector $\tilde{x}$ to the corresponds antenna elements. The baseband precoded and reordered vector $\tilde{x}$ is processed through respective inverse fast Fourier transform (IFFT) blocks 431, 432, 433, converted to analog form in respective digital-to-analog converters (DAC) 441, 442, 443, and amplitude regulated in respective power amplifiers (PA) 451, 452, 452.

The result is propagated over a channel 470 comprising N sub-channels $H_n \in \mathbb{C}^{K \times M}$ for n=1, 2, ..., N. The propagation channels may be collectively represented by a block diagonal matrix $\tilde{H}=\text{blkdiag}\{H_1, H_2, \ldots, H_N\} \in \mathbb{C}^{KN \times MN}$.

If full channel state information (CSI) is available for $\tilde{H}$ at the transmitter side and the BS can design a precoded vector $\tilde{x}$ so that the UEs receive $\tilde{H}\tilde{x}=\tilde{s}$.

For PAPR reduction, Y can be split into two parts where $\tilde{x}_s$ corresponds to the desired signal, and $\tilde{x}_{PAPR}$ (the clipping signal) represents the additional signal used to reduce PAPR for the combined signal. In the wording of the claims, $\tilde{x}_s$ results from application of the primary portion of the precoder setting and $\tilde{x}_{PAPR}$ results from application of the PAPR reduction portion of the precoder setting. As exemplified by part (a) of FIG. 2, DM-RS signals (which are comprised in $\tilde{x}_s$) are typically allocated in only some OFDM symbols and positioned only in parts of the carrier bandwidth (i.e., only in some sub-carriers). Using conventional approaches, $\tilde{x}_{PAPR}$ is a signal that extends over the whole carrier bandwidth (i.e., in all sub-carriers).

The CFR algorithm strives to provide $\tilde{x}_{PAPR}$ so that $\tilde{H}\tilde{x}_{PAPR}$ is as small as possible; i.e., ideally $\tilde{H}(\tilde{x}_s+\tilde{x}_{PAPR})=\tilde{H}\tilde{x}_s+\tilde{H}\tilde{x}_{PAPR}=\tilde{H}\tilde{x}_s+0=\tilde{s}$.

However, when the signal is transmitted at time CSI_T, the channel might have changed compared to the time CSI_R when the channel was estimated; i.e., $\tilde{H}_{CSI\_T} \neq \tilde{H}_{CSI\_R}$. This typically results in that the UEs receive the desired signal s plus an error term E; i.e., $\tilde{H}_{CSI\_R}(\tilde{x}_s+\tilde{x}_{PAPR})=\tilde{H}_{CSI\_R}\tilde{x}_s+\tilde{H}_{CSI\_R}\tilde{x}_{PAPR}=\tilde{s}+E$, and the error term E is represented by $E=(\tilde{H}_{CSI\_R}-\tilde{H}_{CSI\_T})(\tilde{x}_s+\tilde{x}_{PAPR})=(\tilde{H}_{CSI\_R}-\tilde{H}_{CSI\_T})\tilde{x}_s+(\tilde{H}_{CSI\_R}-\tilde{H}_{CSI\_T})\tilde{x}_{PAPR}$.

Reception performance may be deteriorated for several reasons. For example, the UE channel estimation may suffer from the interference of the error term E that affects the frequency parts that carry DM-RS. Alternatively or additionally, the data reception may suffer from the interference of the error term E that affects the frequency parts that carry data. Embodiments presented herein aim to mitigate these problems.

In one example, the CFR algorithm is modified so that the $\tilde{x}_{PAPR}$ signal is set to zero for the frequency parts where DM-RS are allocated (compare with parts (b), (d), and (e) of FIG. 2).

When this approach is applied for every CFR iteration, the CFR algorithm will create a $\tilde{x}_{PAPR}$ signal that reduces PAPR while the DM-RS signals are protected from clipping signal interference; i.e. $\tilde{x}_{PAPR}$ will not contribute to channel estimation errors due to channel aging.

In one example, the CFR algorithm is modified so that the $\tilde{x}_{PAPR}$ signal is reduced for the frequency parts where DM-RS are allocated (compare with part (c) of FIG. 2) to a fraction of the clipping signal result given by each CFR iteration. Selecting the size of this fraction implements a trade-off between channel ageing mitigation and PAPR reduction.

In one example, the CFR algorithm is modified so that the $\tilde{x}_{PAPR}$ signal is set to zero for the frequency parts where DM-RS are allocated and the overall power is reduced in the OFDM symbol where DM-RS is located by letting the scheduler decide to not transmit any data in the frequency parts of the OFDM symbol that are reserved for data transmission (compare with part (d) of FIG. 2). Thus, in this approach, the OFDM symbol where DM-RS is located has frequency parts (e.g., sub-carriers) reserved for data transmission, which are not used. Use of this approach leads to that the CFR algorithm may get a simpler peak reduction case than for an approach where data is actually transmitted in frequency parts of the OFDM symbol reserved for data transmission.

In one example, the CFR algorithm is modified so that the $\tilde{x}_{PAPR}$ signal is set to zero for the frequency parts where DM-RS are allocated and the overall power is reduced in the OFDM symbol where DM-RS is located, which is enabled by reducing the modulation order for data in the OFDM symbol (compare with part (e) of FIG. 2).

A code word may be seen as a data packet that is processed with a coding rate and a modulation, the result often spanning over several OFDM symbols. One approach for reducing the power in the OFDM symbol where DM-RS is allocated involves allowing different modulation schemes to be used for different OFDM symbols that carry parts of the code word.

For example, OFDM symbols carrying DM-RS may use a Quadrature Phase Shift Keying (QPSK) modulation scheme, while OFDM symbols not carrying DM-RS may use a higher order modulation scheme; e.g. 16 Quadrature Amplitude Modulation (16-QAM).

Since the OFDM symbols carrying DM-RS has a lower modulation order than the OFDM symbols not carrying DM-RS, the data power in the OFDM symbols carrying DM-RS can be reduced while achieving equivalent received energy per data bit as for the data transmitted in the OFDM symbols not carrying DM-RS.

The coding rate in the different OFDM symbols could preferably be the same (e.g., to simplify the receiver code word processing), while the number of coded data bits in a specific OFDM symbol could be adapted to the selected modulation scheme. Typically, the chosen modulation and/or the power reduction (per OFDM symbol) may be signaled to the receiver so that it can perform demodulation and decoding correctly.

Using this approach, the CFR algorithm may get a simpler peak reduction case than when data is transmitted in the OFDM symbol with full power.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a multi-antenna transmitter, a radio access node, a user equipment, or a control node.

Embodiments may appear within an electronic apparatus (such as a multi-antenna transmitter, a radio access node, a user equipment, or a control node) comprising arrangements, circuitry, and/or logic according to any of the embodiments described herein. Alternatively or additionally, an electronic apparatus (such as a multi-antenna transmitter, a radio access node, a user equipment, or a control node) may be configured to perform methods according to any of the embodiments described herein.

Figure 5:
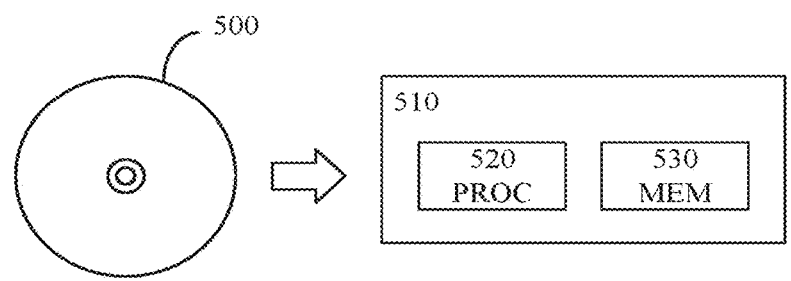
FIG. 5 is a schematic drawing illustrating an example computer readable medium according to some embodiments.

According to some embodiments, a computer program product comprises a tangible, or non-tangible, computer readable medium such as, for example a universal serial bus (USB) memory, a plug-in card, an embedded drive or a read only memory (ROM). FIG. 5 illustrates an example computer readable medium in the form of a compact disc (CD) ROM 500. The computer readable medium has stored thereon a computer program comprising program instructions. The computer program is loadable into a data processor (PROC; e.g., data processing circuitry or a data processing unit) 520, which may, for example, be comprised in a multi-antenna transmitter, a radio access node, a user equipment, or a control node 510. When loaded into the data processor, the computer program may be stored in a memory (MEM) 530 associated with or comprised in the data processor. According to some embodiments, the computer program may, when loaded into and run by the data processor, cause execution of method steps according to, for example, any method as illustrated in FIG. 1 or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A method of controlling peak-to-average power ratio, PAPR, reduction for a multi-antenna transmitter, the method comprising:
   determining a precoder setting for transmission of an orthogonal frequency division multiplexing, OFDM, signal by the multi-antenna transmitter to one or more receivers, wherein the precoder setting comprises a primary portion and a PAPR reduction portion, and wherein the OFDM signal comprises data parts and non-data parts, the non-data parts comprising reference parts; and
   allocating, for at least some of the non-data parts, a first power to the PAPR reduction portion for sub-carriers conveying the non-data parts and allocating a second power to the PAPR reduction portion for other sub-carriers, wherein the first power per sub-carrier is lower than the second power per sub-carrier.

2. The method of claim 1, wherein the first power is zero.

3. The method of claim 1, wherein determining the precoder setting is based on acquired channel estimations.

4. The method of claim 3, further comprising acquiring the channel estimations.

5. The method of claim 4, wherein acquiring the channel estimations comprises receiving reports from the one or more receivers, wherein the reports are indicative of results of channel measurements performed on a previously transmitted OFDM signal.

6. The method of claim 4, wherein acquiring the channel estimations comprises performing reciprocity based channel measurements on received reference signaling.

7. The method of claim 1 further comprising transmitting the OFDM signal while applying the determined precoder setting and using the first and second power allocated to the PAPR reduction portion.

8. The method of claim 1, wherein the primary portion is configured to generate a primary beamforming signal and the PAPR reduction portion is configured to generate a clipping signal, and wherein transmission of the OFDM signal comprises spatially multiplexing the clipping signal onto other directions other than a main direction of the primary beamforming signal.

9. The method of claim 1, further comprising transmitting first control signaling to the one or more receivers, wherein the first control signaling is indicative of at least the first power.

10. The method of claim 1, wherein the reference parts comprise one or more of: demodulation reference signals, DM-RS, and channel state information reference signals, CSI-RS.

11. The method of claim 1, wherein the non-data parts comprise one or more of: acknowledgement signals, ACK, and transmit power control signals, TPC.

12. The method of claim 1, wherein the OFDM signal comprises OFDM symbols, and wherein the OFDM symbols comprise a sub-set of OFDM symbols carrying the non-data parts, the method further comprising reducing an amount of data carried by the sub-set of OFDM symbols.

13. The method of claim 12, wherein reducing the amount of data comprises hindering the sub-set of OFDM symbols from carrying any of the data parts.

14. The method of claim 12, wherein reducing the amount of data comprises determining a first order of modulation for the sub-set of OFDM symbols and determining a second order of modulation for other OFDM symbols, wherein the first order of modulation is lower than the second order of modulation.

15. The method of claim 14, further comprising applying a same coding rate for the sub-set of OFDM symbols as for the other OFDM symbols.

16. The method of claim 14, further comprising transmitting second control signaling to the one or more receivers, wherein the second control signaling is indicative of at least the first order modulation.

17. The method of claim 1, wherein the method is executed responsive to determining that a PAPR reduction mode with power reduction is applicable.

18. The method of claim 17, further comprising transmitting third control signaling to the one or more receivers, wherein the third control signaling is indicative of that the PAPR reduction mode with power reduction is applicable.

19. A computer program product comprising a non-transitory computer readable medium, having thereon a computer program comprising program instructions, the computer program being loadable into a data processing unit and configured to cause execution of the method according to claim 1 when the computer program is run by the data processing unit.

20. An apparatus for controlling peak-to-average power ratio, PAPR, reduction for a multi-antenna transmitter, the apparatus comprising controlling circuitry configured to cause:

determination of a precoder setting for transmission of an orthogonal frequency division multiplexing, OFDM, signal by the multi-antenna transmitter to one or more receivers, wherein the precoder setting comprises a primary portion and a PAPR reduction portion, and wherein the OFDM signal comprises data parts and non-data parts, the non-data parts comprising reference parts; and allocation, for at least some of the non-data parts, of a first power to the PAPR reduction portion for sub-carriers conveying the non-data parts and allocation of a second power to the PAPR reduction portion for other sub-carriers, wherein the first power per sub-carrier is lower than the second power per sub-carrier.

\* \* \* \* \*